(12) United States Patent
Baruch et al.

(10) Patent No.: US 10,235,088 B1
(45) Date of Patent: Mar. 19, 2019

(54) GLOBAL REPLICATION POLICY FOR MULTI-COPY REPLICATION

(71) Applicant: EMC Corporation, Hopkinton, MA (US)

(72) Inventors: Leehod Baruch, Rishon Leziyon (IL); Assaf Natanzon, Tel Aviv (IL); Jehuda Shemer, Kfar Saba (IL); Saar Cohen, Moshav Mishmeret (IL); Amit Lieberman, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 115 days.

(21) Appl. No.: 15/085,142

(22) Filed: Mar. 30, 2016

(51) Int. Cl.
*G06F 12/00* (2006.01)
*G06F 3/06* (2006.01)

(52) U.S. Cl.
CPC ............ *G06F 3/065* (2013.01); *G06F 3/0619* (2013.01); *G06F 3/0683* (2013.01)

(58) Field of Classification Search
CPC ..... G06F 3/0619; G06F 3/065; G06F 2201/84
See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,783,798 B1 * | 8/2010 | Misra | G06F 1/3209 710/60 |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |
| 8,341,115 B1 * | 12/2012 | Natanzon | G06F 11/2071 707/613 |
| 8,370,648 B1 | 2/2013 | Natanzon | |
| 8,380,885 B1 | 2/2013 | Natanzon | |
| 8,392,680 B1 | 3/2013 | Natanzon et al. | |

(Continued)

*Primary Examiner* — Arvind Talukdar
(74) *Attorney, Agent, or Firm* — Daly, Crowley Mofford & Durkee, LLP

(57) ABSTRACT

In one embodiment, a method includes measuring a first parameter associated with copying a storage entity to a first backup site, measuring a second parameter associated with copying the storage entity to a second backup site and determining a replication mode to copy the storage entity to the first backup site and a replication mode to copy the storage entity to the second backup site in response to a replication policy and the first and second parameters measured.

16 Claims, 3 Drawing Sheets

(56) References Cited

U.S. PATENT DOCUMENTS

| | | |
|---|---|---|
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 * | 5/2014 | Natanzon ............ G06F 11/2069 714/2 |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | Benhanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,255 B1 | 4/2017 | Natanzon |
| 9,619,256 B1 | 4/2017 | Natanzon et al. |
| 9,619,264 B1 | 4/2017 | Natanzon et al. |
| 9,619,543 B1 | 4/2017 | Natanzon et al. |
| 9,632,881 B1 | 4/2017 | Natanzon |
| 9,639,295 B1 | 5/2017 | Natanzon et al. |
| 9,639,383 B1 | 5/2017 | Natanzon |
| 9,639,592 B1 | 5/2017 | Natanzon et al. |
| 9,652,333 B1 | 5/2017 | Bournival et al. |
| 9,658,929 B1 | 5/2017 | Natanzon et al. |
| 9,659,074 B1 | 5/2017 | Natanzon et al. |
| 9,665,305 B1 | 5/2017 | Natanzon et al. |
| 9,668,704 B2 | 6/2017 | Fuimaono et al. |
| 9,672,117 B1 | 6/2017 | Natanzon et al. |
| 9,678,680 B1 | 6/2017 | Natanzon et al. |
| 9,678,728 B1 | 6/2017 | Shemer et al. |
| 9,684,576 B1 | 6/2017 | Natanzon et al. |
| 9,690,504 B1 | 6/2017 | Natanzon et al. |

(56) References Cited

U.S. PATENT DOCUMENTS

| | | |
|---|---|---|
| 9,696,939 B1 | 7/2017 | Frank et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,817,606 B1 * | 11/2017 | Byrne .................... G06F 3/065 |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 2014/0032957 A1 * | 1/2014 | Beeston ............ G06F 11/2097 714/2 |
| 2014/0324774 A1 * | 10/2014 | Chen ................ G06F 17/30215 707/611 |
| 2016/0036909 A1 * | 2/2016 | Joshi .................. H04L 67/1095 709/217 |
| 2016/0292250 A1 * | 10/2016 | Chen .................. G06F 11/2097 |

* cited by examiner

GLOBAL REPLICATION POLICY FOR MULTI-COPY REPLICATION

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one embodiment, a method includes measuring a first parameter associated with copying a storage entity to a first backup site, measuring a second parameter associated with copying the storage entity to a second backup site and determining a replication mode to copy the storage entity to the first backup site and a replication mode to copy the storage entity to the second backup site in response to a replication policy and the first and second parameters measured.

In another embodiment, an apparatus includes electronic hardware circuitry configured to measure a first parameter associated with copying a storage entity to a first backup site, measure a second parameter associated with copying the storage entity to a second backup site and determine a replication mode to copy the storage entity to the first backup site and a replication mode to copy the storage entity to the second backup site in response to a replication policy and the first and second parameters measured.

In a further embodiment, an article includes a non-transitory computer-readable medium that stores computer-executable instructions. In an embodiment, the instructions cause a machine to measure a first parameter associated with copying a storage entity to a first backup site, measure a second parameter associated with copying the storage entity to a second backup site and determine a replication mode to copy the storage entity to the first backup site and a replication mode to copy the storage entity to the second backup site in response to a replication policy and the first and second parameters measured.

DETAILED DESCRIPTION

In certain embodiments, the current disclosure may enable techniques to apply a global replication policy to multi-copy replication. In one particular example, a system may determine a replication mode to a link to replicate data in response to a replication policy and parameters measured; and, after a time interval, the system may change the replication mode for the link in response to the replication policy and additional parameter measurements.

Figure 1:
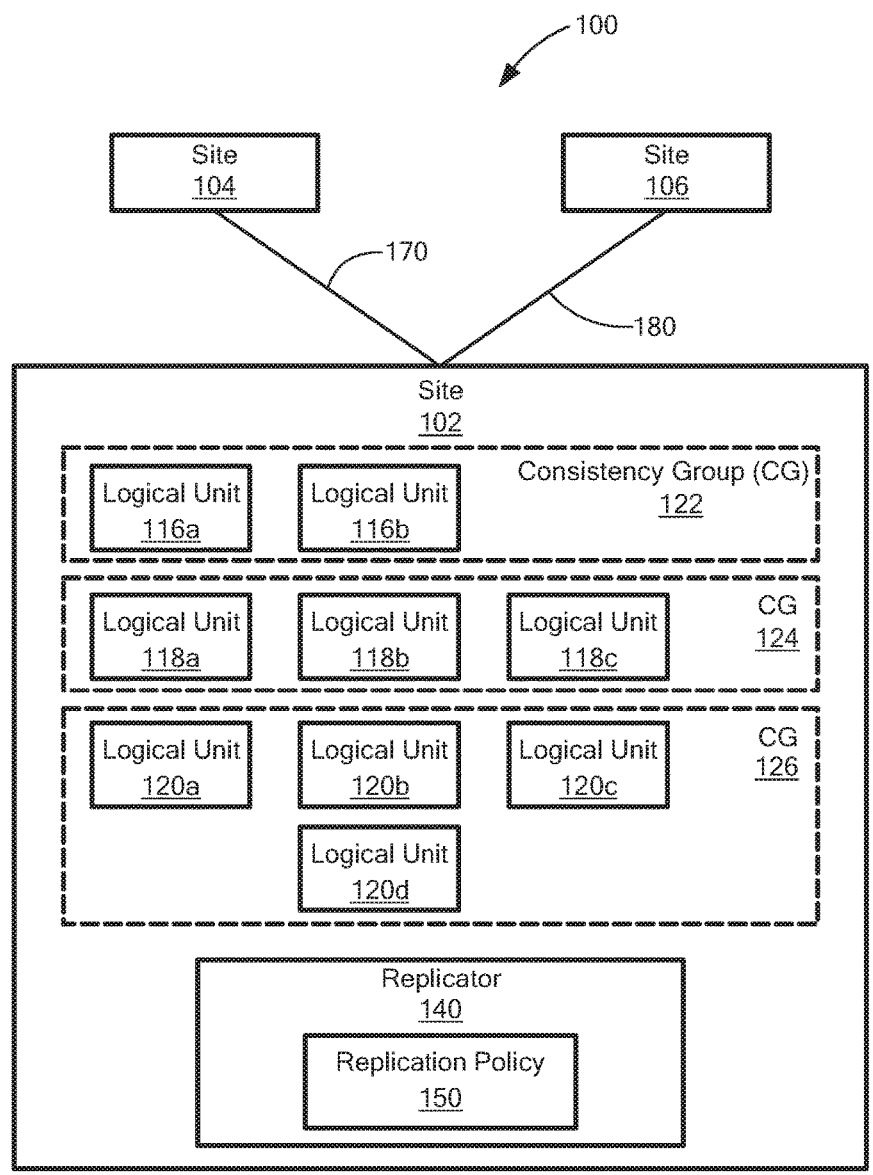
FIG. 1 is a block diagram of an example of a data protection system to apply a global replication policy to multi-copy replication, according to one embodiment of the disclosure.

Referring to FIG. 1, a replication system 100 may include sites 102, 104, 106. In one example, a site may be a storage network. In another example, a site may be a cloud network. In one particular example, the site 102 may be a primary site and the sites 104, 106 may be backup sites.

In one particular example, the system 100 may include features and processes that are similar to approaches described in U.S. Pat. No. 8,478,955, issued Jul. 2, 2013, entitled "VIRTUALIZED CONSISTENCY GROUP USING MORE THAN ONE DATA PROTECTION APPLIANCE;" U.S. Pat. No. 8,433,869, issued Apr. 30, 2013, entitled "VIRTUALIZED CONSISTENCY GROUP USING AN ENHANCED SPLITTER;" and U.S. Pat. No. 8,832,399, issued Sep. 9, 2014, entitled "VIRTUALIZED CONSISTENCY GROUP USING AN ENHANCED SPLITTER," each of which are assigned to the same assignee as the present patent application. All applications in this paragraph are incorporated herein by reference in their entirety.

The site 104 may be connected to the site 102 by a link 170 and the site 106 may be connected to the site 102 by a link 180. In one particular example, the links 170, 180 may be wide area network (WAN) links. The site 102 may include consistency groups (CGs) 122, 124, 126 and a replicator 140. The CG 122 may include logical units 116a, 116b; the CG 124 includes logical units 118a-118c; and CG 126 may include logical units 120a-120d.

The replicator 140 may include a replication policy 150 used to determine a replication mode for each link to transfer data from a primary site to a backup site and may dynamically change a replication mode for a link based on parameters measured. In one particular example, a replication mode may be one of an asynchronous mode, a synchronous mode or a snapshot based replication mode.

In one particular example, replication modes may include features and processes that are similar to approaches described in U.S. Pat. No. 7,774,565, issued Aug. 10, 2010, entitled "METHODS AND APPARATUS FOR POINT IN TIME DATA ACCESS AND RECOVERY;" U.S. Pat. No. 8,335,771, issued Dec. 18, 2012, entitled "STORAGE ARRAY SNAPSHOTS FOR LOGGED ACCESS REPLICATION IN A CONTINUOUS DATA PROTECTION SYSTEM;" and U.S. Pat. No. 8,898,515, issued Nov. 25, 2014, entitled "SYNCHRONOUS REPLICATION USING MULTIPLE DATA PROTECTION APPLIANCES ACROSS MULTIPLE STORAGE ARRAYS," each of which are assigned to the same assignee as the present patent application. All applications in this paragraph are incorporated herein by reference in their entirety.

In one particular illustrative example, the replication policy 150 requires that the two backup copies of the CG 124 being generated: one copy of CG 124 is stored on the site 104 and one backup copy is stored on the site 106. The replication policy 150 also requires that one backup is provided synchronously and the other backup is provided asynchronously. At one point-in-time, the latency on the link 170 is measured to be smaller than the latency measured on the link 180. In this example, the replicator 140 determines that a copy of the CG 124 provided to the site 104 over the link 170 is synchronous replication and the copy of the CG 124 provided to the site 106 over the link 180 is asynchronous replication. After a time interval, the latency of the link 170 is measured to be greater than the latency measured on the link 180. The replicator 140 responds by replicating the copy of the CG 124 to the site 104 over the link 170 asynchronously and replicating the copy of the CG 124 to the site 106 over the link 180 synchronously.

In another particular illustrative example, the replication policy 150 requires that each of the CGS 122, 124, 126 provide one synchronous copy to a site and one asynchronous copy to a site and requires that the CGs 122, 124, 126 replicate to site 104 and site 106. In this particular example, the bandwidth of the links 170, 180 are limited and changing over time. The replicator 140 may choose to replicate CG 122 and CG 124 synchronously to site 104 and asynchronously to site 106; and to replicate CG 126 synchronously to site 106 and asynchronously to site 104. After a time interval, the bandwidth of the link 170 may become too small for synchronous replication of CG 122 and CG 124 (e.g., since there is no compression in synchronous replication), the replicator 140 may choose to switch the replication of CG 122 and make replication synchronous to site 106 and asynchronous to site 104.

In one particular example, the replicator 140 may assign synchronous replication to links with lower relative latency. In another particular example, the replicator 140 may assign snapshot-based replication to links the bandwidth is small or expensive. In another particular example, the replicator 140 may assign snapshot-based replication to links for which the capacity of the storage at the copy is expensive.

In other particular examples, the replicator 140 may choose a replication mode based on inter-consistency group considerations. For example, the replicator 140 may select links with higher bandwidth for CGs to use a continuous replication mode and use snapshot-based replication mode for limited bandwidth links since snapshot-based replication consumes less bandwidth compared to continuous replication.

Figure 2:
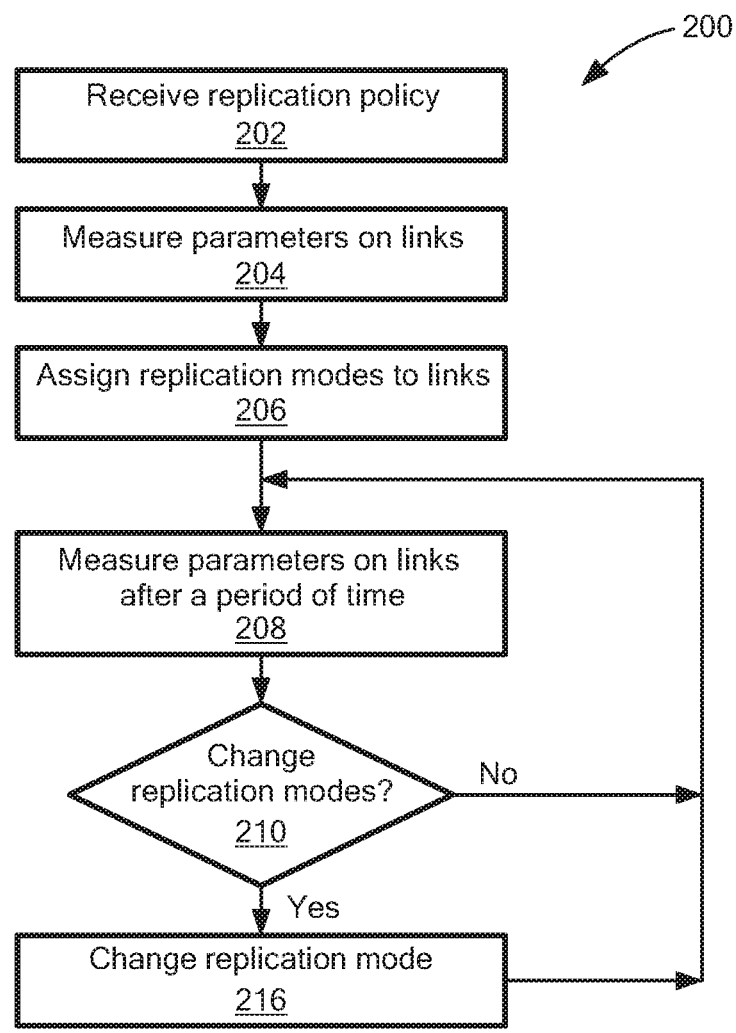
FIG. 2 is a flowchart of an example of a process to apply a global replication policy to multi-copy replication, according to one embodiment of the disclosure.

Referring to FIG. 2, a process 200 is an example of a process to apply a global replication policy to multi-copy replication, according to one embodiment of the disclosure.

Process 200 may receive a replication policy (202). In one example, a replication policy 150 may be entered manually. In another example, the replication may be entered using an automated system. In one particular example, the replication policy 150 may include a number of copies required and which sites (e.g., sites 104, 106) to store the copies. In another example, the replication policy 150 may include a number of links that should be synchronous, asynchronous or snapshot-based and a time interval to use each mode.

Process 200 may measure parameters (204). In one examples, the parameters may include at least one of latency in the links (e.g., links 170, 180), the bandwidth of the links (e.g., links 170, 180) and a cost of storage on each site (site 104, 106).

Process 200 may assign replication modes to links (206). For example, in response to the replication policy 150 and the parameters measured in processing block 204, the replicator 140 selects a replication mode for each link.

Process 200 may measure parameters after a period of time (208) and determines if the replication modes for the links should be changed (210). For example, the replicator 140 may determine if the replication modes are still applicable based on the additional measured parameters and the replication policy 150.

If the replication modes should be changed, process 200 may change the replication modes (216). For example, the replicator 140 may change the replication modes for one or more links.

Figure 3:
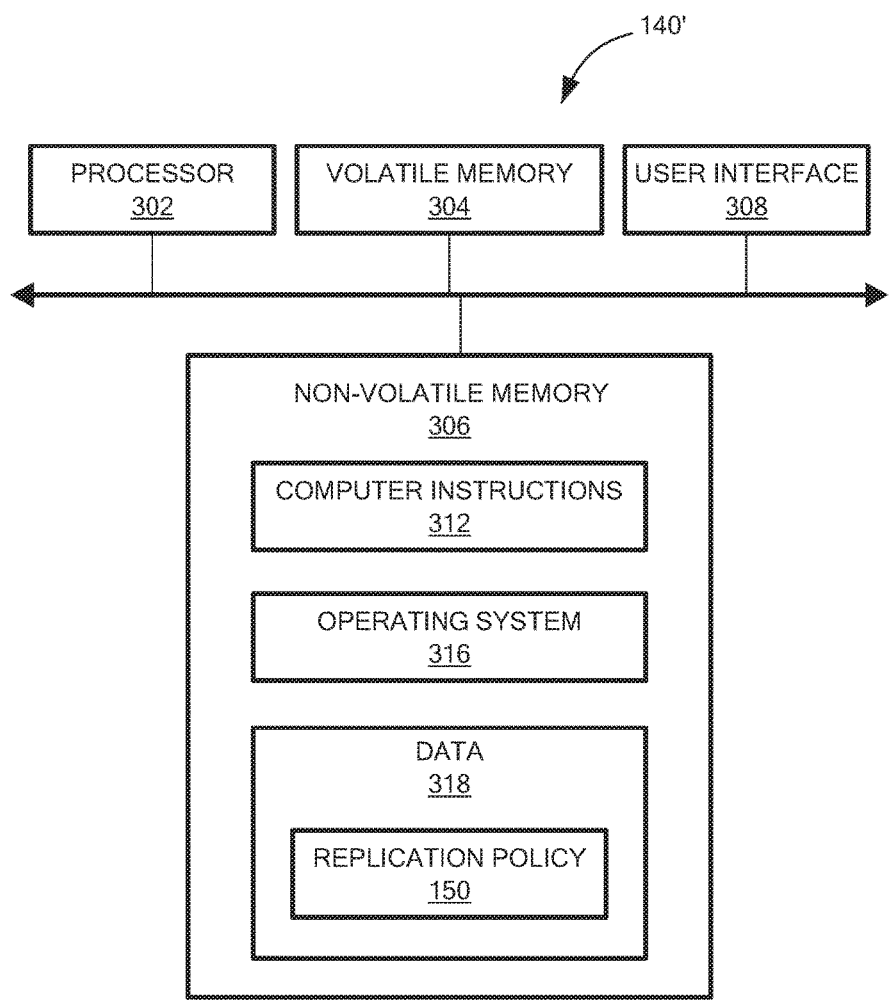
FIG. 3 is a computer on which any portion of the process of FIG. 2 may be implemented, according to one embodiment of the disclosure.

Referring to FIG. 3, in one example, the replicator 140 may be the application-consistent generator 140'. The application-consistent generator 140' may include a processor 302, a volatile memory 304, a non-volatile memory 306 (e.g., hard disk, flash memory) and the user interface (UI) 308 (e.g., a graphical user interface, a mouse, a keyboard, a display, touch screen and so forth). The non-volatile memory 306 may store computer instructions 312, an operating system 316 and data 318. The data 318 may include the replication policy 150. In one example, the computer instructions 312 may be executed by the processor 302 out of volatile memory 504 to perform at least a portion of the processes described herein (e.g., process 200).

The processes described herein (e.g., process 200) are not limited to use with the hardware and software of FIG. 3; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 200 is not limited to the specific processing order of FIG. 2. Rather, any of the processing blocks of FIG. 2 may be re-ordered, combined or removed, performed in parallel or in serial, as necessary, to achieve the results set forth above.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising: performing replication, in accordance with a replication policy, of storage entities from a source site to a first backup site over a first link and from the source site to a second backup site over a second link;
   after a first time period:
   measuring a first parameter associated with copying a first storage entity of the storage entities to the first backup site over the first link;
   measuring the parameter associated with copying a second storage entity of the storage entities to the second backup site over the second link;
   comparing values of the parameter derived from the measuring over the first and second links;
   and dynamically changing a replication mode to copy the first storage entity to the first backup site and a replication mode to copy the second storage entity to the second backup site as a function of the replication policy and the measured values of the parameter, the changing configured to compensate for variances in the relative values of the parameter measured,
   wherein the replication mode to copy the first storage entity is a first type of replication mode and the replication mode to copy the second storage entity is a second type of replication mode that is different than the first type of replication mode, and wherein the dynamically changing includes switching the replication mode of the first storage entity to the second type of replication mode and switching the replication mode of the second storage entity to the first type of replication mode;
   wherein the measuring the parameter is a second measurement of the parameter at a time succeeding the first time period, wherein when the parameter measured is latency, and upon determining at a time preceding the first time period, the measured parameter indicates that latency of data transfer is smaller on the first link than on the second link, and upon determining that the replication mode to copy the storage entity to the first backup site is synchronous replication and that the replication mode to copy the first storage entity to the second backup site is asynchronous replication, performing the synchronous and asynchronous replications prior to conclusion of the time period; wherein, after the first time period, and in response to performing second measurements of the parameter, determining the measured parameter indicates that the latency of data transfer is larger on the first link than on the second link, changing the replication mode to copy the first storage entity to the first backup site from synchronous replication to asynchronous replication and changing the replication mode to copy the second storage entity to the second backup site from asynchronous replication to synchronous replication.

2. The method of claim 1, wherein the parameter comprises cost of storage on the first and second backup sites, and
   wherein the dynamically adjusting the replication mode to copy the first storage entity to the first back site and the replication mode to copy the second storage entity to the second backup site includes changing the replication mode to snapshot replication mode for one of the storage entities corresponding to one of the first and second backup sites in which capacity of the respective backup site is determined to be expensive for corresponding one of the storage entities relative to another of the back up sites.

3. The method of claim 1, further comprising storing the replication policy, the replication policy comprising at least one of a number of copies of the storage entity required, backup sites to store the copies of the storage entity, a number of links to use for synchronous, asynchronous or snapchat-based replication, and a time interval to use each replication mode.

4. The method of claim 1, wherein the storage entities are consistency groups comprising logical units.

5. An apparatus, comprising:
   electronic hardware circuitry configured to: perform replication, in accordance with a replication policy, of storage entities from a source site to a first backup site over a first link and from the source site to a second backup site over a second link;
   after a first time period:
   measure a parameter associated with copying a first storage entity of the storage entities to the first backup site over the first link;
   measure the parameter associated with copying a second the storage entity of the storage entities to the second backup site over the second link;
   compare values of the parameter derived from the measuring over the first and second links;
   and dynamically change a replication mode to copy the first storage entity to the first backup site and a replication mode to copy the second storage entity to the second backup site as a function of the replication policy and the first and second parameters measured values of the parameter, the changes configured to compensate for variances in the relative values of the parameter measured;
   wherein the measuring the parameter is a second measurement of the parameter at a time succeeding the first time period, wherein when the parameter measured is latency, and upon determining at a time preceding the first time period, the measured parameter indicates that latency of data transfer is smaller on the first link than on the second link, and upon determining that the replication mode to copy the storage entity to the first backup site is synchronous replication and that the replication mode to copy the first storage entity to the second backup site is asynchronous replication, performing the synchronous and asynchronous replications prior to conclusion of the time period; wherein, after the first time period, and in response to performing second measurements of the parameter, determining the measured parameter indicates that the latency of data transfer is larger on the first link than on the second link, changing the replication mode to copy the first storage entity to the first backup site from synchronous replication to asynchronous replication and changing the replication mode to copy the second storage entity to the second backup site from asynchronous replication to synchronous replication.

6. The apparatus of claim 5, wherein the circuitry comprises at least one of a processor, a memory, a programmable logic device of a logic gate.

7. The apparatus of claim 5, wherein the group of parameters further comprise cost of storage on the first and second backup sites.

8. The apparatus of claim 5, further comprising circuitry configured to store the replication policy, the replication policy comprising at least one of a number of copies of the storage entity required, backup sites to store the copies of the storage entity, a number of links to use for synchronous, asynchronous or snapchat-based replication, and time interval to use each replication mode.

9. The apparatus of claim 5, wherein the storage entities are consistency groups comprising logical units.

10. An article comprising: a non-transitory computer-readable medium that stores computer-executable instructions, the instructions causing a machine to: perform replication, in accordance with a replication policy, of storage entities from a source site to a first backup site over a first link and from the source site to a second backup site over a second link;
after a first time period:
measure a first parameter associated with copying a first storage entity of the storage entities to a first backup site over the first link;
measure the second parameter associated with copying a second the storage entity of the storage entities to the second backup site over the second link;
compare values derived from the measuring over the first and second links;
and dynamically change a replication mode to copy the first storage entity to the first backup site and a replication mode to copy the second storage entity to the second backup site in response to as a function of the replication policy and the first and second parameters measured values of the parameter, the changes configured to compensate for variances in the relative values of the parameter measured;
wherein the measuring the parameter is a second measurement of the parameter at a time succeeding the first time period, wherein when the parameter measured is latency, and upon determining at a time preceding the first time period, the measured parameter indicates that latency of data transfer is smaller on the first link than on the second link, and upon determining that the replication mode to copy the storage entity to the first backup site is synchronous replication and that the replication mode to copy the first storage entity to the second backup site is asynchronous replication, performing the synchronous and asynchronous replications prior to conclusion of the time period; wherein, after the first time period, and in response to performing second measurements of the parameter, determining the measured parameter indicates that the latency of data transfer is larger on the first link than on the second link, changing the replication mode to copy the first storage entity to the first backup site from synchronous replication to asynchronous replication and changing the replication mode to copy the second storage entity to the second backup site from asynchronous replication to synchronous replication.

11. The article of claim 10, wherein the parameters further comprise a cost of storage on the first and second backup sites.

12. The article of claim 10, further comprising instructions causing the machine to store the replication policy, the replication policy comprising at least one of a number of copies of the storage entity required, backup sites to store the copies of the storage entity, a number of links to use for synchronous, asynchronous or snapshot-based replication, and a time interval to use each replication mode.

13. The article of claim 10, wherein the storage entities are consistency groups comprising logical units.

14. The method of claim 1, wherein when the parameter measured is bandwidth, the storage entities are consistency groups (CGs), and the mode of replication for a first portion of the CGs on the first link is synchronous replication mode, the mode of replication for a second portion of the CGs on the first link is asynchronous replication mode, the mode of replication for a first portion of the CGs on the CGs on the second link is synchronous replication mode, and the mode of replication for a second portion of the CGs on the second link is asynchronous replication mode,
wherein upon determining the measured parameter indicates that the bandwidth is smaller on the first link than on the second link, selecting at least one of the CGs from the second portion of the CGs operating in the asynchronous replication mode and changing the replication mode for the at least on CG to synchronous replication mode, and selecting at least one of the CGs from the first portion of the CGs on the first link operating in synchronous replication mode and changing the replication mode for the at least one CG of the first portion of the CGs to asynchronous replication mode.

15. The method of claim 1, wherein the parameter measured is bandwidth, and the dynamically changing the replication mode is based on inter-consistency groups (CGs), the changing comprising selecting one of the first and second links having higher bandwidth for the CGs to use a continuous replication mode and selecting another of the first and second links having limited amount of bandwidth to use a snapshot-based replication mode.

16. The method of claim 1, wherein the links comprise a wide area network.

* * * * *